J. W. EARDLY.
Sled-Brakes.

No. 154,787.  Patented Sept. 8, 1874.

Witnesses:
  T. P. Stokes
  N. J. Drummond

Inventor:
  Jas. W. Eardly
  By N. J. Baxter, Attorney

UNITED STATES PATENT OFFICE.

JAMES W. EARDLY, OF CASCADE TOWNSHIP, KENT COUNTY, MICHIGAN.

IMPROVEMENT IN SLED-BRAKES.

Specification forming part of Letters Patent No. 154,787, dated September 8, 1874; application filed August 27, 1874.

*To all whom it may concern:*

Be it known that I, JAMES W. EARDLY, of the township of Cascade, county of Kent and State of Michigan, have invented a new and useful Improvement in Sled-Brakes, of which the following is a true and specific description, and with the accompanying drawings, to which reference is herein made, explains and illustrates the construction and workings of the same.

Figure 1:
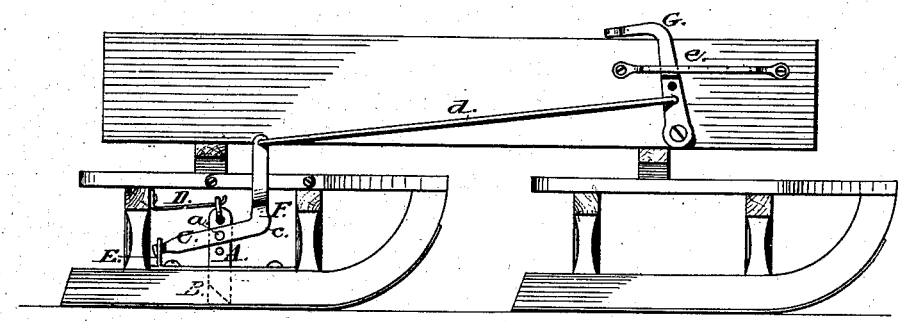
Figure 2:
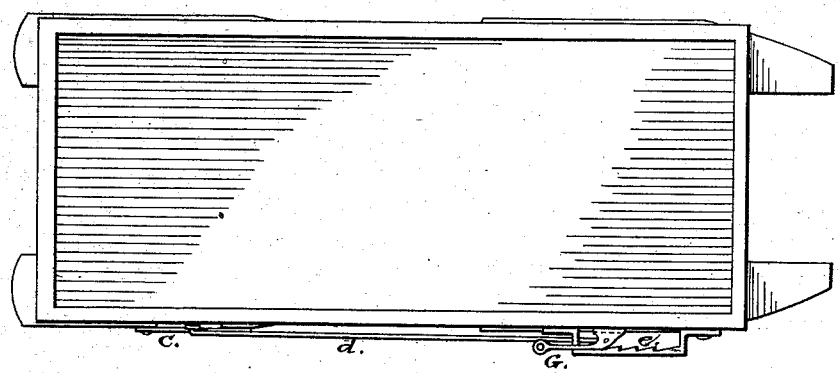
Figure 3:
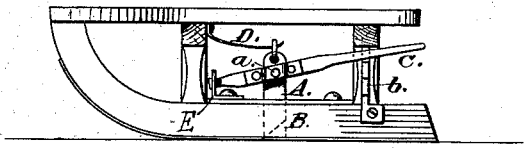

Figure 1 is one side view of the sled or sleigh, showing the brake, its application and attachments. Fig. 2 is a plan view of the top of the sleigh, showing more particularly the ratchet holding the handle of the brake in position. Fig. 3 is another side view of the brake and attachments.

The object of my invention is to prevent the sliding or slipping of a sled or sleigh upon icy or steep inclinations, by means of a brake, so attached to the runner as to be worked by the foot or hand.

The brake A passes through the mortise B of the runner, and is attached by a pin, $a$, to the movable lever, C, above which it projects, to form a further attachment to the flexible spring D, which suspends the brake beyond interference with the track. This spring fastens at the other extremity to the beam of the sleigh. When the brake is applied the spring bends downward, returning to its position when the pressure is removed from the lever C. The movable lever C is fixed at one end to a support rising from the runner, as shown at E, serving as a fulcrum. On the left side the lever runs back to the rear end of the runner. Thus suspended as a movable handle, it carries the brake A downward by application of pressure. It is secured by the ratchet $b$, plated upon the knee, and can be operated from the rear. On the right side, at E, the support is at the rear end, and the lever C runs forward reversely in the same manner as on the left side, to a point, $c$, where it extends outward and upward as a bent lever, F, passing through the rave, from which point, at its extremity, a rod, $d$, runs forward, diagonally upward, to a handle, G, pivoted upon the side of the box, which handle moves forward by application of pressure, and drawing upon the rod $d$ depresses the movable bent lever C F, forcing the brake A downward upon the track. This handle, like the other, is secured by a ratchet, $e$, to hold or release the brake. When the box is removed the rod $d$ is detached from the lever F, allowing the sled or sleigh to be used without the box with perfect convenience.

Either brake is sufficient, or both may be applied together, and may be used either with full runners or upon traverse sleighs or bobs.

I am aware that sled-brakes are in use in which the point of the brake rests upon the track; but the attachments and parts, and the combination of parts, are different from those herein described.

I claim as my invention—

1. The brake A, combined with the movable lever C, the fulcrum E, the rod $d$, the handle G, the ratchet $e$, and flexible spring D, so as to be applied to the track through the mortise B, substantially as set forth.

2. The brake A, combined with the movable lever C, the fulcrum E, the flexible spring D, and ratchet $b$, so as to be applied to the track through the mortise B, substantially as set forth.

JAS. W. EARDLY.

In presence of—
DENNIS BROUGHAM,
H. VAN AALDEREN.